Sept. 8, 1953
A. J. SYROVY ET AL
2,651,395
CLUTCH CONSTRUCTION
Filed Nov. 19, 1947
3 Sheets-Sheet 1
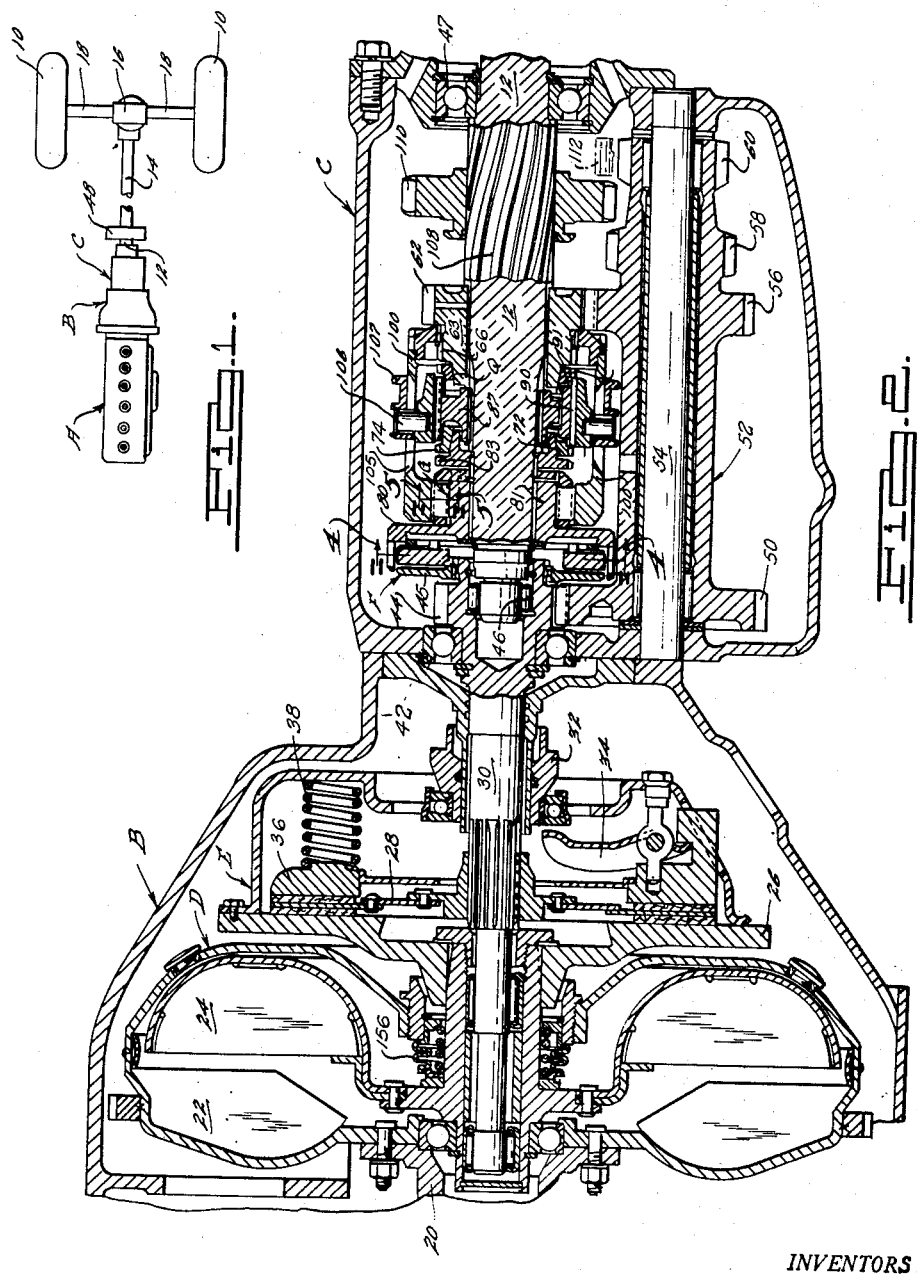
INVENTORS.
Augustin J. Syrovy.
William T. Dunn.
BY Roy T. Bucy.
Harness and Harris
ATTORNEYS

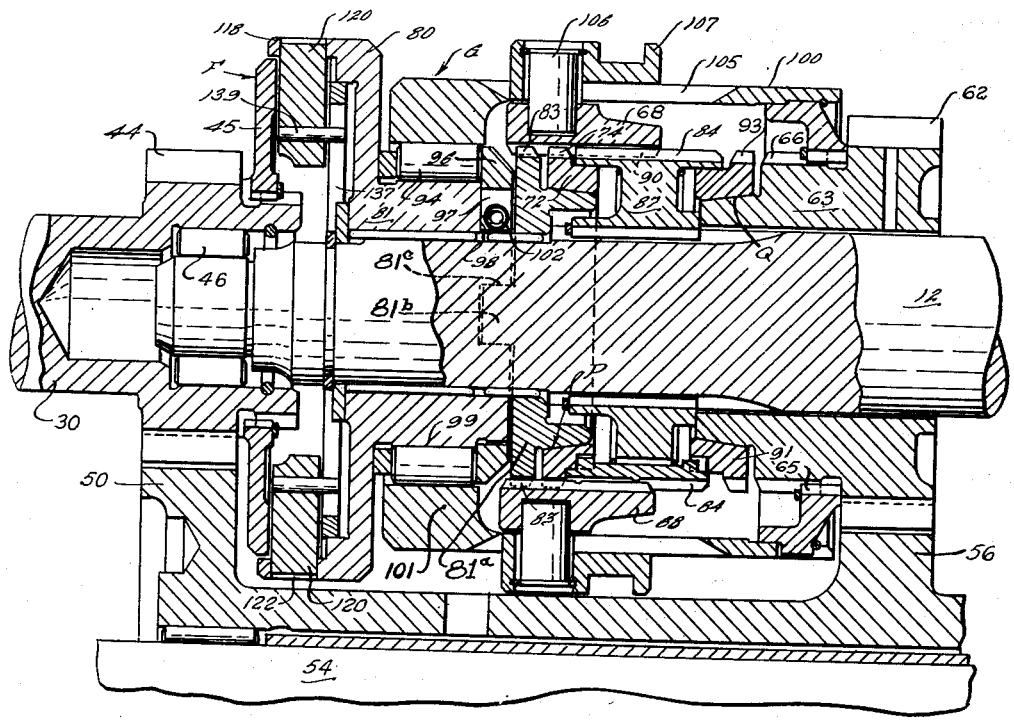

Sept. 8, 1953
A. J. SYROVY ET AL
2,651,395
CLUTCH CONSTRUCTION
Filed Nov. 19, 1947
3 Sheets-Sheet 3
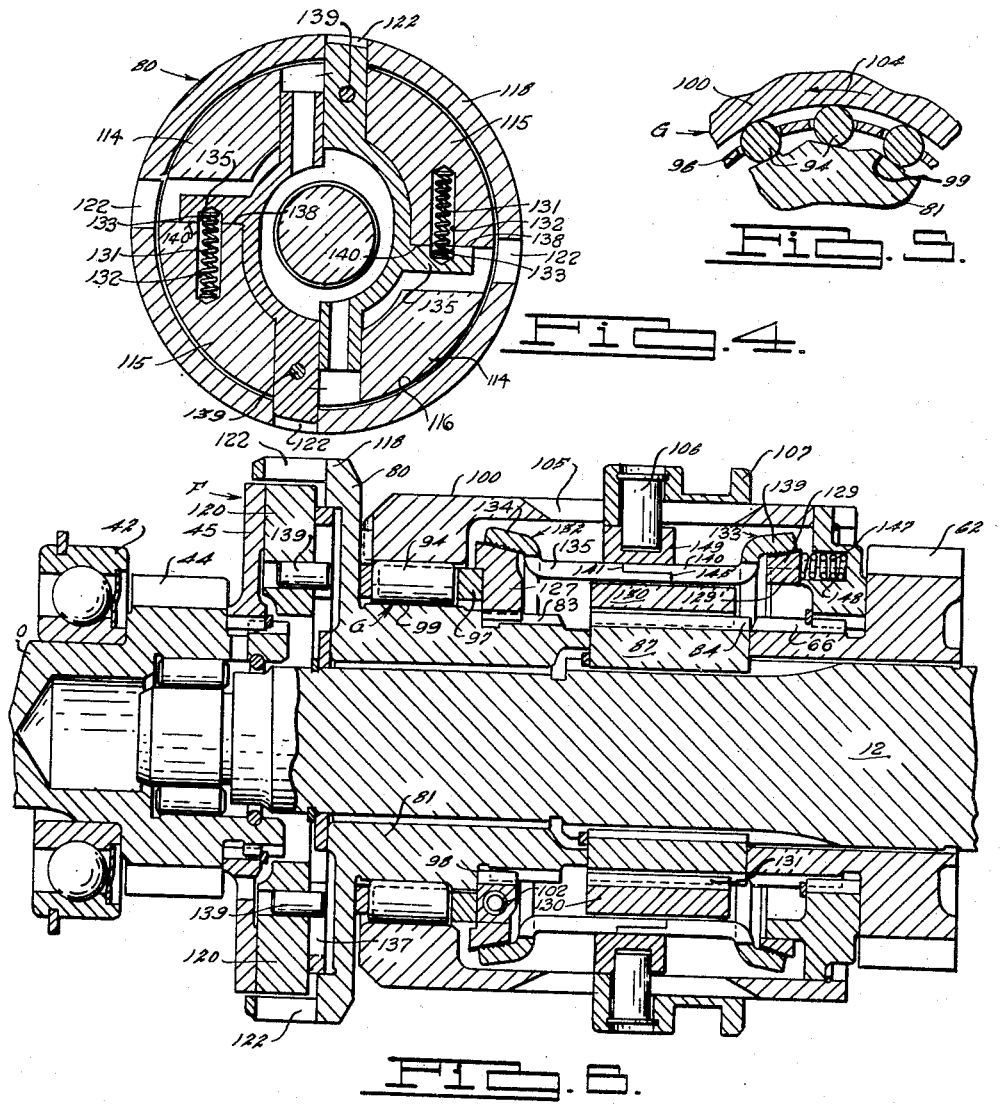
INVENTORS.
Augustin J. Syrovy.
William T. Dunn.
BY Roy T. Bucy.
Harness and Harris
ATTORNEYS.

Patented Sept. 8, 1953

2,651,395

UNITED STATES PATENT OFFICE 2,651,395

CLUTCH CONSTRUCTION

Augustin J. Syrovy, William T. Dunn, and Roy T. Bucy, Detroit, Mich., assignors to Chrysler Corporation, Highland Park, Mich., a corporation of Delaware Application November 19, 1947, Serial No. 786,980

10 Claims. (Cl. 192—48)

This invention relates to power transmission, and particularly to improvements in clutch controls for semi-automatic transmissions of the manually selective type which transmissions provide, for instance, three forward speeds and a reverse speed.

One of the disadvantages of transmissions of the aforesaid type is the requirement for de-clutching and making several selective gear changes in order to get into the cruising speed ratio drive from a starting gear ratio drive. To overcome this disadvantage, automatic shifting has been provided in some automatic type transmissions but such has been limited to the higher price lines due to the transmissions of this type requiring expensive mechanical and electrical controls in order to accomplish the automatic changes in speed ratio drive. The present invention contemplates a simplified, low cost, mechanical arrangement, free of complicated controls, for the accomplishment of automatic speed ratio changes, such an arrangement being particularly adaptable for relatively low priced automobiles. In its broad aspect the invention incorporates in a manually selective transmission a centrifugal force controlled clutch in combination with an overrunning clutch, these elements being arranged so that automatic changes in speed ratio drive between a starting gear ratio and a cruising direct drive ratio may be readily accomplished. When our novel construction is used in combination with a fluid coupling, it is possible, under ordinary conditions of forward drive, to merely shift from a neutral position to a starting gear ratio and thereafter de-clutching is unnecessary as the upshifts and downshifts, to accomplish the required changes in speed ratio drive, take place automatically.

An object of the present invention is to provide an improved, inexpensive transmission incorporating a driver controlled automatic mechanical upshift between a starting second or intermediate speed and cruising direct drive or high speed.

Another object of this invention is to provide an improved, overrunning clutch construction for transmissions in which automatic changes in speed ratio between a reduced speed starting gear ratio and a cruising direct drive ratio are readily accomplished.

Another object is to provide a simple, inexpensive three forward speeds and reverse speed transmission for low price cars which transmission has at least one automatic speed change.

A further object is to provide a transmission of the aforesaid type having a two-way drive in each speed ratio and in addition a freewheeling intermediate speed ratio adapted to be automatically upshifted into a direct drive ratio.

An additional object is to provide an improved, simplified transmission having a starting, one-way, intermediate or second speed drive, adapted to be automatically shifted into high speed direct drive, and also a starting, two-way, intermediate or second speed drive operable for engine braking purposes.

A further and specific object of this invention is to provide a transmission having a manual shift from a neutral condition to one-way, relatively slow speed drive from which drive there is an automatic, delayed action, upshift to a two-way relatively fast speed drive, which latter drive is establishable by engagement of a centrifugal force type pawl clutch, the driven member of said clutch, prior to engagement, being constantly driven at the speed of said one-way drive to facilitate a synchronized shift into either of said drives.

Another object is to provide a transmission having means for establishing a one-way and a two-way relatively slow speed ratio drive from neutral and means for establishing a relatively fast speed ratio drive from said one-way slow speed drive, the construction being such that all drives are effected by synchronized shifts.

These and other objects and advantages of our invention will become apparent from the following description when taken in conjunction with the accompanying drawings wherein:

Fig. 1 is a diagrammatic showing of the power plant and drive mechanism of a vehicle incorporating the present invention;

Fig. 2 is a sectional elevational view through the fluid coupling, clutch and speed ratio changing transmission of a vehicle embodying our invention, the gearing being shown in neutral position;

Fig. 3 is an enlarged sectional elevational view of a portion of the transmission shown in Fig. 2, the shift sleeve being shown in forward engaged position with the pawls of the centrifugal clutch extended to transmit direct drive;

Fig. 4 is a sectional view taken along line 4—4 of Fig. 2 showing the centrifugal pawl mechanism with the pawls engaged;

Fig. 5 is a sectional view taken along line 5—5 of Fig. 2 showing the overrunning clutch mechanism;

Fig. 6 is a sectional elevational view of a transmission embodying a modification of our invention, the gearing being shown in neutral; and Fig. 7 is a plan view of the blocker elements used in the modification shown in Fig. 6.

Referring now to the drawings wherein similar reference characters are used to designate corresponding parts in the several views, Fig. 1 illustrates a typical diagrammatic arrangement of a vehicle embodying the transmission mechanism constituting the present invention. The vehicle engine A is connected to the driving wheels 10 of the vehicle through a fluid power transmitting and clutch unit B and a change speeding gearing C, shown in detail in Figs. 2-5 inclusive, and comprising a three speeds forward and reverse transmission having an automatically operative shift arrangement from an underdrive ratio into and out of the direct drive ratio. As seen in Fig. 1, the output or driven shaft 12 of the unit C is connected by means of the usual propeller shaft 14 to the customary differential gear box 16 which in turn drives the axle shafts 18 on which are mounted the driving wheels 10.

As best been in Fig. 2, we preferably arrange for transmitting drive from the crankshaft 20 of engine A to the transmission C through clutch means B comprising a fluid coupling D of the kinetic type operating in conjunction with a manually releasable friction clutch E of conventional design which is primarily employed to facilitate manual shift in the transmission C. Due to the use of a fluid coupling it is possible to start from any selected gear ratio and accordingly, for ordinary forward drive, starting in either of the hereinafter described intermediate or second speed gears is simplified and most advantageous for declutching and manual shifting is either materially reduced or eliminated.

The engine crankshaft 20 drives the coupling impeller 22 and the rotation of the impeller 22 causes fluid to circulate in the vaned passages of the fluid coupling D so as to drive the vaned runner 24 in the customary manner of operation for fluid couplings of the type illustrated. The runner 24 drives the clutch member 26 of the friction clutch E. Driven clutch member 28 is fixed to intermediate shaft 30 and is adapted to be drivingly disengaged from driving member 26 by depressing a clutch pedal (not shown) which slides throw-out sleeve 32 forwardly to operate levers 34 so as to unload driving pressure plate 36. Springs 38 load this plate 36 and cause engagement of the clutch E when the clutch pedal is released.

Shaft 30 extends rearwardly into the housing or casing 40 of transmission C (Fig. 2) where it is rotatably supported by a ball bearing unit 42. The rearwardly extending end of shaft 30 is formed with a main drive pinion 44. Also formed on the rear end of the shaft 30 is an enlargement constituting the pawl carrier 45 of the centrifugal clutch F, more clearly illustrated in Fig. 3 and subsequently described in detail. The drive pinion 44 is hollow and journals, by a bearing unit 46 (see Fig. 2), the forward end of the transmission driven shaft 12, the rear end of shaft 12 being journaled in bearing unit 47. Shaft 12 may also carry at its rear end a propeller shaft brake drum 43, having braking mechanism (not shown) associated therewith.

The drive pinion 44 continuously meshes with a gear 50 for driving the countershaft gear cluster 52. The gear cluster 52 is rotatably mounted on a countershaft 54 which is supported at its end portions by the casing 40. The gear cluster 52 includes a second or intermediate speed pinion 56, a first or low speed pinion 58 and a reverse pinion 60.

The intermediate or second speed pinion 56 constantly meshes with an intermediate or second speed gear 62 which is journaled for rotation on the driven shaft 12. The second speed gear 62 has a forwardly extending hub 63 provided with teeth 66. Hub portion 63 is also provided with a frusto-conically shaped surface Q adapted to receive blocker-synchronizing ring 91 having teeth 93.

Forwardly of intermediate speed gear 62 a hub 87 is splined to the driven shaft 12. Hub 87 has external splines or teeth 84 adapted to receive the internal teeth 90 of a shift sleeve 68 slidably mounted on the hub 87 for forwardly and rearwardly axial movement.

A centrifugal clutch F, preferably of the pawl type, see Fig. 4, is mounted between the forward end of the driven shaft 12 and the rear end of the drive pinion 44. The clutch F comprises the pawl carrier 45, fixed on the rear end of drive pinion 44, and a clutch shell member 80, rotatably mounted on the forward end of driven shaft 12 by means of a hub portion comprising a main portion 81 and a rearwardly projecting extension 81a drivingly connected with the main portion 81 by teeth 81b received in seats 81c of the portion 81. The pawl carrier 45 is provided with pawl guides 114, 115 having arcuate faces 116 fitting within the overhanging portion 118 of the clutch shell member 80. Slidably secured to the carrier guides 114, 115 are a pair of radially movable pawls 120 which are adapted for limited outward movement oppositely to one another to engage the pawl receiving slots 122 provided in the overhanging portion 118 of the clutch shell member 80. Engagement of pawls 120 with slots 122 establishes a two-way direct drive between the driving shaft 30 and the driven shaft 12 if the hub portion 81 of clutch shell 80 is drivingly connected to the driven shaft hub 87 by the clutch sleeve 68. Four pawl receiving slots are provided in the overhanging portion 118 of the shell member 80, the slots being 90 degrees apart. Each of the pawls 120 has a pair of side faces in sliding engagement with side faces of the pawl guide members 114, 115 as clearly shown in Fig. 4. In order to normally urge the pawls inwardly of the pawl cage formed by the guide members 114, 115, so as to prevent their engagement with the shell slots 122, until a predetermined speed of rotation of the pawl carrier 45 has been attained, control or governor compression springs 131 are seated in recesses 132 in the guide portions 115, the springs 131 extending into recesses 133 in the shoulders 135 of pawls 120. Adjustment of the engaging speed of the pawls 120 may be made either by replacing the springs 131 with springs of different force values or by means of adjustment bolts (not shown) which may be provided so as to vary the tension of the springs.

The slots 122 in the pawl shell 80 are arranged so that diametrically opposite slots will simultaneously register with the pawls 120 so as to receive the pawls under the conditions hereinafter described.

The pawls 120 tend to move outwardly to engage the slots 122 after the pawl carrier 45 reaches a speed of rotation sufficient to overcome the resistance of the springs 131. To prevent ratcheting between the pawls 120 and the slots 122, and to insure alignment of the pawls 120 with the pawl slots 122, when the pawls move outwardly to engage the slots, a balk ring 137, carried by shell member 80, is provided. The balk ring is of the type shown in the application of Robert W. Wolfe, Serial No. 780,011, filed October 15, 1947. The aligning slots in the balk ring 137 are engaged by pins 139 carried by the pawls 120. When the pawls move outwardly into the slots 122, their movement is limited by engagement of the portions 138 of the pawl shoulders 135 with the inner surfaces 140 of the guide portions 115 of the pawl carrier 45.

Gear 62 carries a cylindrical, axially extending, overrunning clutch shell 100. An overrunning or freewheel clutch, generally designated by the letter G (Figs. 2, 3 and 5), is positioned between the shell 100 and the hub 81 of the shell member 80 of centrifugal clutch F. Overrunning clutch G provides a one-way driving connection between the shell 100 carried by the intermediate speed gear 62 and the hub portion 81 of the shell member 80 of the centrifugal clutch F, clutch G being adapted to drivingly lock the gear 62 and the shell 80 together upon tendency of the gear 62 to rotate faster than the shell 80, in a forward direction, while permitting overrun of the shell 80 relative to the gear 62. The clutch G is of the conventional overrunning type and is provided with rollers 94 and a cage or carrier 96 having tabs 97 receivable into slots 98 in the shell hub portion 81. The hub portion 81 of the centrifugal clutch shell 80 is provided with cam faces 99 forming the inner race of the overrunning clutch device G. The overrunning clutch shell 100, splined to the gear 62 at 65, bridges the hub 87 and sleeve 68 and has a forward annular portion 101 surrounding the overrunning clutch rollers 94 so as to provide a smooth runway therefor. A torsion spring 102 biases the rollers 94 in the direction of the arrow 104, see Fig. 5, so as to move the rollers into a locked-up position and lock-up occurs whenever the gear 62 tends to rotate forwardly, in the direction of the arrow 104, faster than the shell 80.

The rear end portion 81a of the hub portion of centrifugal clutch shell 80 is provided with teeth 83 as well as a frusto-conically shaped surface P on which is rotatably mounted a conventional synchronizing and blocker element or ring 72 having clutch blocker teeth 74. The teeth 83 and 74 are pointed on their rear ends, as are the forward ends of sleeve teeth 90, engageable with the teeth 83 and 74, to facilitate blocking and shifting of shift sleeve 68. In a like manner teeth 93 and 66 are pointed on their forward ends, as are the rear ends of sleeve teeth 90, to facilitate rearward shift of the sleeve 68. Preferably the teeth 74, 83, 93, 66 and 90 are equally angled at each side. The teeth 90 of sleeve 68 are preferably of the same form as the blocker teeth 74 and 93 and the hub teeth 66 and 83. The blocker rings 72 and 91 are provided with suitable clocking slots (not shown) which are adapted to receive mating clocking lugs (not shown) carried by the hub 87, this slot and lug means connecting the rings 72 and 91 to the hub 87 in a manner well known in the art.

To provide for the shifting of sleeve 68 the overrunning clutch shell 100 is provided with axially extending slots 105 which form channels for the shift pins 106. The shift pins 106 are carried by and project inwardly from a shift ring 107 which ring extends concentrically about the overrunning clutch shell 100. Shift pins 106 have their inner end portions seated in a channel extending around the shift sleeve 68. The pins 106 connect the shift ring 107 to the shift sleeve 68 so as to provide means for axial shift of sleeve 68 but this connection does not transmit drive from the shell 100 to the sleeve 68. Slots 105 limit the forward and rearward axial movement of the shift sleeve 68.

It will be seen that our construction provides a transmission in which the outer shell 100 of the overrunning clutch G bridges the shift sleeve 68 and provides a portion 101 which overhangs the rollers 94 and inner race 99 of the overrunning clutch G. This construction eliminates side torque in the overrunning clutch and also provides additional space for the use of blocker rings of various sizes and shapes. It has been found that enlarged blocker rings of rugged construction are desirable in certain types of transmissions and our arrangement provides sufficient space for considerable variation in the size and shape of the blocker rings without materially altering the other elements of the transmission. Also, this construction provides means for constantly driving the driven member 80 of the centrifugal clutch F from the gear 62 through overrunning clutch G. Such a construction synchronizes shifting of the shift sleeve 68 due to the fact that the gear 62 and clutch member 80 normally rotate at the same speed.

The shift sleeve 68 is adapted to be shifted forwardly from the neutral position shown in Fig. 2 to the second speed, one way drive, freewheeling position wherein the sleeve teeth 90 are engaged with the pawl shell hub teeth 83 to thereby establish the freewheel second speed drive ratio between the input shaft 30 and the driven shaft 12 through the means consisting of elements 30, 44, 50, 56, 62, 100, G, 81, 83, 90, 68, 84, 87 and 12. This is a synchronized shift, the speed of second speed gear 62 and shaft 12 being synchronized by ring 72 before engagement of sleeve teeth 90 with shell hub teeth 83 may be effected.

The sleeve 68 is also adapted to be shifted rearwardly of the neutral position, shown in Fig. 2, to a second speed, two-way drive position so as to engage the sleeve teeth 90 with the teeth 66 on the hub 63 of gear 62 to thereby establish a non-freewheel, two-way second speed drive through the means consisting of elements 30, 44, 50, 56, 62, 66, 90, 68, 84, 87 and 12. This is also a synchronized shift due to the action of blocker ring 91. When established in non-freewheel second, sleeve teeth 90 are disengaged from the pawl shell hub teeth 83 and this prevents drive by the gear 62 through the freewheel device G.

In the neutral position of the sleeve 68, see Fig. 2, the sleeve teeth 90 are disengaged from both the pawl shell hub teeth 83 and the second speed gear teeth 66. In shifting from neutral to either of the second speed starting gear ratios it is merely necessary to move the shift sleeve 68 either forwardly or rearwardly to engage either the teeth 83 or the teeth 66 respectively. If the sleeve 68 is engaged in either the automatic freewheel second speed or the two-way drive second speed, it is a simple matter to declutch and to shift to the other second speed gear for it merely requires disengagement of the sleeve teeth and the gear teeth through which the drive is being transmitted and engagement of the sleeve teeth with the other set of gear teeth. To accomplish this change it is merely necessary to engage one set of gear teeth. In prior constructions of this type is frequently required engagement of two or more sets of gear teeth in shifting between an automatically upshifting, freewheel second speed and a two-way drive second speed.

The sleeve 68 is adapted to be shifted into the various positions by a shift yoke and rail mechanism (not shown) under control of the driver, suitable stops or detents being provided to properly locate the sleeve.

Rearwardly of the gear 62 the shaft 12 is provided with a spiral splined portion 108 on which is slidably mounted a combination low or first speed and reverse gear 110, this member being shown in its neutral position in Fig. 2. This gear 110 may be shifted forwardly or rearwardly of its neutral position by the suitable yoke and rail mechanism (not shown) under driver control. When shifted forwardly the gear 110 becomes engaged with the low speed or first speed pinion 58 to establish the low or first speed drive ratio between the shafts 30 and 12, the drive transmission being through elements 30, 44, 50, 58, 110, 108 and 12. When shifted rearwardly the gear 110 becomes engaged with an idler gear 112 that is constantly in mesh with the reverse pinion gear 60, thus establishing reverse drive between the shafts 30 and 12. It will be understood that when shifting the gear 110 the shift sleeve 68 is in neutral position.

*Operation*

In describing the operation of this transmission let it be assumed that the shift sleeve 68 and the combination low-reverse gear 110 are both in neutral positions, the clutch E engaged and the engine idling at approximately 450 R. P. M. Under these conditions the impeller 22 of the fluid coupling D will rotate at engine speed. There will be very little slip in the fluid coupling at this time due to the drag of the coupling seal 156 between the impeller 22 and runner 24 and the light load imposed on the coupling by the clutch G, pawl carrier 45 and countershaft parts. Hence, the pawl carrier 45 will rotate at a speed slightly under engine speed which is not sufficiently high to cause centrifugal force to move the clutch pawls 120 outwardly into the slots 122 of the pawl shell 80. Moreover, there will be no drive between the gear 62 and sleeve 68 since the teeth 66 of the gear 62 are disconnected from the teeth 90 of the shift sleeve 68. Furthermore, as the teeth 90 of sleeve 68 are also disconnected from the teeth 83 on the hub portion 81a of the pawl shell 80, there is no drive transmitted from the gear 62 through the freewheel clutch shell 100, the freewheel clutch G and hub teeth 83 to the sleeve 68.

In order to obtain forward movement of the car, the driver releases the clutch E so as to permit manual shift into one of the two second speed starting gear ratios or into low gear.

If the driver desires to start in the automatic upshifting second speed gear ratio he shifts the clutch sleeve 68 forwardly during which movement the sleeve teeth 90 becomes engaged with the teeth 83 of the pawl shell hub 81a so as to drivingly connect the hub 81 to the sleeve 68. Upon completion of this shifting movement the driver will engage the clutch E and depress the fuel accelerator to speed up the engine and the car will be driven forwardly in the freewheeling second speed ratio referred to above, through the gear train comprising shaft 30, pinion 44, gear 50, pinion 56, gear 62, shell 100, freewheeling device "G," hub 81, teeth 83 and 90, sleeve 68, hub 87 and shaft 12. This is the starting drive ratio that permits an automatic upshift to direct drive, under driver control. The car will be accelerated in this freewheel second speed ratio, with the various elements being speeded up as the engine speed is increased by further throttle opening movement of the accelerator. Manifestly, the pawl carrier 45 will rotate at a speed corresponding to that of the coupling runner 24 and at some predetermined speed of these elements, for example, 650 to 750 R. P. M. substantially corresponding to a car speed in direct drive of about 13.6 to 16 M. P. H. the centrifugal force of the pawls 120 will overcome the resistance of the springs 131 and tend to move the pawls radially outward but their movement is restrained by the balk ring 137. The balk ring 137 will not permit the pawls to move outwardly under these conditions for the pawl carrier 45 is at this time rotating faster than the shell 118. This condition will continue so long as the runner 24 imposes torque on the shaft 30 that exceeds the load on the driven shaft 12. When the driver wishes direct drive speed ratio to be established he merely releases the accelerator to decelerate the engine and relieves the driving torque through the transmission, whereupon, the runner 24 and pawl carrier 45 will slow down and when the rotative speeds of the carrier 45 and shell 80 cross each other, that is, become synchronized, the balk ring 137 will have aligned the pawls 120 with the slots 122 so that the pawls 120 will move outwardly to cause engagement of the pawls 120 and the slots 122. Upon depression of the accelerator to again speed up the engine, the transmission of torque will again be resumed and direct drive will have been established. Direct drive is transmitted through the train comprising the shaft 30, pawl carrier 45, pawls 120, slots 122, shell 80, hub 81, teeth 83 and 90, sleeve 68, hub 87 and shaft 12. This is a two-way drive. It will be understood that in making engagement with the slots 122, the pawls 120 will be cushioned by the fluid coupling D which will absorb any shock occurring in the engagement and will also reduce to a minimum, vibration and noise.

The pawl clutch F will remain engaged and the vehicle be driven in direct drive until the speed of the pawl carrier 45 falls below a predetermined R. P. M. for instance, approximately 500 to 625 R. P. M. corresponding to a vehicle speed of about 10.5 to 12.75 M. P. H. in direct drive, whereupon the springs 131 will effect a release of the pawls 120 from the slots 122 and hence a release of the direct drive. Upon release of the pawls 120, direct drive through the shell 80 ceases and the freewheel unit G will simultaneously and automatically re-establish freewheel second speed drive through the transmission. In view of this automatic operation it is possible, for example, for the driver to slow down the vehicle in approaching a traffic signal and to obtain an automatic downshift from direct drive to freewheel second drive ratio in the process, all without releasing the clutch E. After applying the brakes to bring the vehicle to a stop at the traffic signal, the driver may allow the transmission to remain in freewheel second speed drive ratio, without any creep of the vehicle occurring, inasmuch as at this time the engine idle speed is preferably insufficient to develop the torque required to overcome the drag load of the vehicle on the runner of the fluid coupling D. When the traffic signal changes, the driver need merely depress the accelerator pedal to accelerate the engine and the vehicle will again move forward in freewheel second speed drive ratio after which an automatic upshift, under driver control, may be accomplished when the necessary vehicle speed has been attained.

It is sometimes desirable, for instance, when coasting down a hill in direct drive or freewheel second, to obtain engine braking in second speed. This may be obtained by the driver releasing the clutch E and shifting the clutch sleeve 68 rearwardly to successively disengage sleeve teeth 90 and hub teeth 83 and then engage the sleeve teeth 90 with the teeth 66 on the hub gear 62 to establish a two-way engine braking drive comprising the shaft 12, hub 87, sleeve 68, gear 62, pinion 56, gear 50, pinion 44 and shaft 30. In making this shift, if the pawls 120 be then engaged with slots 122 in direct drive, the release of clutch E, prior to shift of sleeve 68, relieves the driving torque between the pawls and the shell slots and also momentarily reduces the speed of rotation of the pawl carrier 45 so that if there is insufficient centrifugal force to urge the pawls outwardly against the force exerted by the springs 131 the pawls will be retracted by springs 131 and disengaged from slots 122. With the sleeve teeth 90 and clutch teeth 66 engaged the vehicle is established in a two-way, non-freewheel, over-speed drive for engine braking purposes. Note that whether or not the pawls 120 are disengaged is of no moment since the shell 80 can overrun the gear 62.

Shift from two-way second speed drive to freewheeling second speed drive is obtained by releasing the clutch E to obtain a release or reversal of driving torque on the engaged teeth 66, 90 whereupon a forward shift of the sleeve 68 will disengage these teeth and subsequently engage the sleeve teeth 90 with the teeth 83 on the hub 81. Engagement of teeth 83 and 90 establishes the freewheel second speed drive from the gear 62 through the shell 100, and the freewheel clutch G to the sleeve 68, hub 87 and shaft 12. This shift between the one-way and two-way second speed drives is readily accomplished due to the fact that gear 62 and clutch member 80 normally rotate at the same speed.

If high torque multiplication is desired, for starting under adverse conditions, the shift sleeve 68 is left in neutral position and the low speed gear 110 is shifted forwardly to engage the low speed pinion 58. Thereafter upon depression of the accelerator the vehicle will be driven through the shaft 30, pinion 44, gear 50, pinion 58, gear 110 and shaft 12 in the low or first speed ratio.

Reverse drive is made available by shifting the combination low speed and reverse gear 110 rearwardly to engage the idler gear 112 to thereby establish reverse drive through the shaft 30, pinion 44, gear 50, pinion 60, idler gear 112, gear 110, and shaft 12.

It will be understood that adequate means are provided for locking the shift sleeve 68 in neutral when making any shift of the gear 110 and conversely the gear 110 is locked in a neutral position when shift is made of the sleeve 68.

Referring to Figs. 6 and 7 there is shown a modified form of our invention in which a different type of blocker ring construction is used from that disclosed in Figs. 1 through 5. In this modified construction the shift sleeve 130 has internal teeth 131 engaged with splineways 84 of the hub 87, sleeve 130 being adapted for forwardly or rearwardly axial shift. Forward shift of sleeve 130 clutches sleeve teeth 131 with teeth 83 of the centrifugal clutch F so as to provide means for the transmission of one type of underdrive and direct drive between the drive pinion 44 and the driven shaft 12, whereas rearward shift of sleeve 130 clutches the teeth 131 with the teeth 66 of the intermediate speed gear 62 so as to provide for transmission of a two-way, reduced speed drive. Each such shift of sleeve 130 is made under control of a blocker synchronizing means to insure synchronous rotation of the teeth to be clutched, this means preventing a complete clutching shift until the synchronized relationship is established. The synchronizing control means includes friction blocker ring elements 132 and 133.

The blocker element 132 includes an annular portion 134, having a frusto-conical shaped, internal, friction surface engageable with the frusto-conical shaped, external, blocker ring supporting surface of element 127, and a plurality of circumferentially spaced, axially extending fingers 135. Fingers 135 are adapted to be received in axially extending openings 136 formed in the outer periphery of the shift sleeve 130. Each finger 135 is reduced in thickness, along a portion of its length, to provide a radially outwardly extending and axially facing abutment 141 and is reduced in width to provide oppositely disposed cam shoulders 137 respectively engageable with cam shoulders 138 at the ends of the transverse sleeve openings 136 along the adjacent side of the sleeve 130. The cam shoulders 137 and 138 provide a synchronizing blocking means for the shift of sleeve teeth 131 into engagement with teeth 83, this means receiving axial thrust which forces blocker element 132 into synchronizing frictional drive engagement with the blocker ring supporting element 127. Each opening 136 in the shift sleeve 130 is circumferentially larger than the width of the main portion of the finger element 135 normally positioned therein prior to clutching engagement. The enlarged finger openings 136 permit limited relative rotation between the shift sleeve 130 and the blocker ring element 132. When synchronized clutching engagement between elements 127 and 132 is established then axial thrust of the sleeve 130 causes relative movement between the elements 130 and 132 which releases the blocking shoulders 137, 138 to permit completion of the forward clutching shift of sleeve 130.

The blocker element 133 is similar to blocker element 132 and has an annular portion 139 provided with an internal, frusto-conical shaped, friction surface engageable with a similarly shaped external blocker ring supporting surface on blocker ring supporting element 129, element 129 being splined to the gear 62 as shown at 129'. Blocker ring element 133 has a plurality of circumferentially spaced, axially extending fingers 140 respectively extending into the openings 136 of the shift sleeve 130. Each finger 140 is reduced in thickness, along a portion of its length to provide an abutment portion 145 and is reduced in width to provide opposed cam shoulders 142 respectively engageable with cam surfaces 143, at the ends of the sleeve openings 136 along the side of the sleeve adjacent the element 133. The cam surfaces 142 and 143 are adapted to block the shift of sleeve teeth 131 into engagement with the teeth 66 of gear 62 and to receive axial thrust from the sleeve for forcing blocker element 133 into synchronizing frictional driving engagement with the blocker ring supporting element 129. As previously described in connection with blocker element 132, it will be noted that the sleeve openings 136 are circumferentially larger than the width of blocker fingers 140 so as to permit limited relative rotation between the shift sleeve 130 and the blocker element 133 and accordingly when the aforesaid frictional driving engagement is established relative movement between sleeve 130 and element 133 will release the blocking shoulders 142 and 143 to permit completion of the clutch shift between teeth 131 of the shift sleeve and teeth 66 of intermediate speed gear 62.

The reduced inner end portions of each pair of registering fingers 135, 140 overlap in the receiving recess 136 and cooperate one with the other to position the blocker elements 132, 133 in relatively light frictional engagement with the associated blocker supporting surfaces 127 and 129. For this purpose the free end of each finger 135 engages the shoulder 145 of its registering finger 140 and the free end of each of the fingers 140 engage the abutment 141 of the registering finger 135, although for purposes of manufacture and assembly it may be expedient for only one of such free ends to engage the abutment of a registering finger for this engagement alone will be sufficient to position the blocker elements for relatively light frictional engagement with their cooperating parts. It will be understood that the latter engagement is of a degree sufficient to cause the elements 132, 133 to rotate with the cooperating parts 127, 129 to one extreme position relative to recesses 136, when the speed of rotation of sleeve 130 differs from that of either teeth 83 or 66 and thereby disposes a cam shoulder 137 in blocking relationship to a shoulder 138 as well as a cam shoulder 142 in blocking relationship to a shoulder 143.

While the initial abutting engagement of fingers 135 and 140 may be established on assembly and relied on to produce the necessary light frictional engagement to energize the blockers as aforesaid, nevertheless, it may be expedient for manufacture and assembly to provide greater tolerances than would exist in the construction so far described and we have, therefore, provided a plurality of coil springs 147, each received in a bore 148 in gear 62, springs 147 exerting an axial thrust against blocker supporting element 129. The action of springs 147 will take up clearances resulting from variations in manufacture of the blocker components and will compensate for wear of the blocker components. The axial thrust exerted upon the blocker ring 133 by the springs 147 will be transmitted to the other blocker ring 132 through the abutting, overlapping fingers 135 and 140.

If desired, the internal frusto-conical shaped surfaces of the portions 134 and 139 of blocker rings 132 and 133 respectively may be threaded to improve the frictional engagement between these abutting elements. The shift sleeve 130 has connected thereto an external channel shaped portion 149 adapted to receive shift pins 106 carried by shift ring 107. Pins 106 rotate in the channel of member 149 but drive is not transmitted from the shell 100 to the sleeve 130 through these pins. Shift ring 107 is mounted on overrunning clutch shell 100 and shift pins 106 extend through slots 105 in the shell 100 so as to provide means for shifting the sleeve 130 axially.

By the construction disclosed in Figs. 6 and 7 it will be seen that a construction permitting the use of enlarged blocker rings has been provided. Furthermore, this modified construction permits considerable variation in the type of blocker ring used in a transmission of this type. A construction permitting variation in the type of blocker ring, without material change of the other elements of the transmission, is particularly advantageous in that the blocker ring construction can be selected to meet the particular job for which the transmission is designed and no other material alterations need be made in the construction of the transmission.

From the above description it will be seen that we have provided a novel transmission construction having an automatic speed upshift and downshift, free of complicated control devices and effecting a low cost, simplified transmission structure. It will be understood that although the particular arrangement disclosed herein is well adapted for carrying out the objects of our invention, various modifications, changes and substitutions may be made without departing from the spirit thereof. The present invention is, therefore, to be construed to include all such modifications, changes, and substitutions as may come within the scope of our invention as set forth in the appended claims.

We claim:

1. In a power transmitting device, a driving shaft, a driven shaft, a first clutch member carried by said driving shaft and non-rotatable relative thereto, a second clutch member rotatably mounted on said driven shaft, said clutch members being adapted to be synchronously engaged to provide for a two-way direct drive connection between said driving and driven shafts, a gear rotatably mounted on the driven shaft, means arranged to continuously rotate said gear on said driven shaft, a shell carried by said gear and mounted concentrically about said driven shaft so as to permanently extend between said gear and said second centrifugal clutch member, a one-way drive transmitting device connected between said shell and said second clutch member to drive said second clutch member at the speed of said gear, and a shift sleeve mounted on said driven shaft and shiftable axially thereof, said shift sleeve being adapted to be synchronously shifted to one axial position so as to drivingly connect said second clutch member to said driven shaft to establish a one-way drive to said driven shaft from said gear which drive may be converted into a two-way direct drive between said driving shaft and said driven shaft, said sleeve also being adapted to be shifted axially, to another position, to respectively disconnect said one-way drive from said gear and directly connect said sleeve with said gear to establish a two-way drive between said gear and said driven shaft.

2. A clutch construction adapted to drivingly connect a pair of rotatable, driving and driven members for the transmission of a plurality of different drives comprising a first, automatically actuable, clutch device having a first clutch member drivingly mounted on said driving member and a second clutch member, that is drivingly engageable with said first clutch member, journalled on said driven member, a second, manually operable, clutch device drivingly mounted on said driven member, having shiftable drive transmitting means, said second clutch member of said first clutch device having means adapted to be drivingly engaged with the shiftable means of said second clutch device in one position of said shiftable means to transmit one drive between said driving and driven members, a gear journalled on said driven member having means adapted to be drivingly engaged with the shiftable means of said second clutch device in a second position of said shiftable means to transmit a second drive between said driving and driven members, a first drive transmitting means permanently extending between said gear and said second clutch member of said first clutch device in both of the said positions of said shiftable means including a one-way drive transmitting mechanism arranged to permit said second clutch member of said first clutch device to overrun said gear in one direction of rotation, manually operable control means for selectively engaging the shiftable means of said second clutch device with the second clutch member of the first clutch device and with said gear, and a second drive transmitting means connected between said driving member and said gear.

3. A clutch construction adapted to drivingly connect a pair of axially aligned, rotatable, driving and driven shafts for the transmission of a plurality of different drives comprising a first, driving shaft speed controlled clutch device having a first clutch member drivingly mounted on said driving shaft and a second clutch member, that is drivingly engageable with said first clutch member, journalled on said driven shaft, a second, manually controlled clutch device drivingly mounted on said driven shaft having a shiftable means movable between different positions to provide means for transmitting different drives between said shafts, said second clutch member of said first clutch device having means adapted to be drivingly engaged with the shiftable means of said second clutch device, a gear journalled on said driven shaft having means adapted to be drivingly engaged with the shiftable means of said second clutch device, a first drive transmitting means permanently extending between said gear and said second clutch member of said first clutch device including a one-way drive transmitting mechanism arranged to permit said second clutch member of said first clutch device to overrun said gear in one direction of rotation, manually operable control means for selectively engaging the shiftable means of said second clutch device with the second clutch member of the first clutch device and with said gear, and a second drive transmitting means connected between said driving shaft and said gear, said first drive transmitting means being continuously connected between said gear and the second clutch member of the first clutch device for all positions of the shiftable means of the second clutch device.

4. A clutch construction adapted to drivingly connect a pair of axially aligned, rotatable, driving and driven shafts for the transmission of a plurality of different drives comprising a first, driving shaft speed controlled clutch device having a first clutch member drivingly mounted on said driving shaft and a second clutch member, that is drivingly engageable with said first clutch member, journalled on said driven shaft, a second, manually controlled clutch device drivingly mounted on said driven shaft having a shiftable means movable between different positions to provide for the transmission of the said drives, said second clutch member of said first clutch device having means adapted to be drivingly engaged with the shiftable means of said second clutch device to provide for the transmission of one of said drives, a gear journalled on said driven shaft having means adapted to be drivingly engaged with the shiftable means of said second clutch device to provide for the transmission of another of said drives, speed synchronizing blocker means arranged between said second clutch device and both said second clutch member of said first clutch device and said gear, a first drive transmitting means permanently extending between said gear and said second clutch member of said first clutch device during the transmission of each of said drives including a one-way drive transmitting mechanism arranged to permit said second clutch member of said first clutch device to overrun said gear in one direction of rotation, manually operable control means for selectively engaging the shiftable means of said second clutch device with the second clutch member of the first clutch device and with said gear, and a second drive transmitting means connected between said driving shaft and said gear.

5. A clutch construction adapted to drivingly connect a pair of axially aligned, rotatable, driving and driven members for the transmission of a plurality of different drives comprising a first, automatically operable centrifugal force actuated, pawl type clutch device including a first clutch member drivingly mounted on said driving member and a second clutch member, that is drivingly engageable with said first clutch member, journalled on said driven member, a second, manually operable, toothed, clutch device drivingly mounted on said driven member having a toothed sleeve mounted for axial shift relative thereto, said second clutch member of said first clutch device having toothed means adapted to be drivingly engaged with the shiftable sleeve of said second clutch device to provide for the transmission of one of said drives, a gear journalled on said driven member having tooth means adapted to be drivingly engaged with the sleeve of said second clutch device to provide for the transmission of another of said drives, speed synchronizing blocker rings drivingly connected to said second clutch device and arranged between said second clutch device and both said gear and the second clutch member of said first clutch device, a sleeve-like drive transmitting means permanently connected between and bridging said gear and said second clutch member of said first clutch device during the transmission of each of said drives, said drive transmitting means having an overrunning clutch mechanism connecting the second clutch member and the gear arranged to permit said second clutch member of said first clutch device to overrun said gear in one direction of rotation, and manually operable control means for selectively engaging the toothed sleeve of said second clutch device with the second clutch member of the first clutch device and with said gear.

6. A clutch construction adapted to drivingly connect a pair of axially aligned, rotatable, driving and driven members for the transmission of a plurality of different drives comprising a first, automatically operable centrifugal force actuated, pawl type clutch device including a first clutch member drivingly mounted on said driving member and a second clutch member, that is drivingly engageable with said first clutch member, journalled on said driven member, a second, manually operable, toothed, clutch device drivingly mounted on said driven member having a toothed sleeve mounted for axial shift relative thereto, said second clutch member of said first clutch device having toothed means adapted to be drivingly engaged with the shiftable sleeve of said second clutch device to provide for the transmission of one of said drives, a gear journalled on said driven member having tooth means adapted to be drivingly engaged with the sleeve of said second clutch device to provide for the transmission of another of said drives, resiliently suspended speed synchronizing blocker rings drivingly connected to said second clutch device and arranged between said second clutch device and both said gear and the second clutch member of said first clutch device, a sleeve-like drive transmitting means permanently connected between and bridging said gear and said second clutch member of said first clutch device during the transmission of each of said drives, said drive transmitting means having an overrunning clutch mechanism connecting the second clutch member and the gear arranged to permit said second clutch member of said first clutch device to overrun said gear in one direction of rotation, and manually operable control means for selectively engaging said toothed sleeve of said second clutch device with the second clutch member of the first clutch device and with said gear.

7. A clutch construction to drivingly connect a pair of rotatable driving and driven members comprising a first centrifugal clutch member, drivingly carried by said driving member and non-rotatable relative thereto, a second centrifugal clutch member, adapted to be engaged with said first centrifugal clutch member after said first clutch member attains a predetermined speed of rotation, said second clutch member being rotatably mounted on said driven member by means of a hub portion, said hub portion including a blocker ring supporting surface and a toothed peripheral portion, a gear journalled on said driven member and spaced axially from said second clutch member having a hub portion provided with a toothed peripheral portion and a blocker ring supporting surface, a speed synchronizing blocker ring mounted on each of said blocker ring supporting surfaces, an overrunning clutch shell drivingly carried by said gear and concentrically mounted about said driven member so as to bridgingly extend between said gear and said second centrifugal clutch member, overrunning clutch roller means positioned between and drivingly and continuously connecting said shell and the hub of said second centrifugal clutch member to permit said second clutch member to overrun said gear in one direction of rotation, a toothed shift sleeve splined to said driven shaft and shiftable axially thereof, said sleeve having teeth adapted to be engaged with the teeth on the hub portion of said gear when said sleeve is shifted to one axial position and also having teeth adapted to be engaged with the teeth on the hub portion of said second centrifugal clutch member when said sleeve is shifted to a different axial position, shift of said sleeve into engagement with the teeth on one of said hub portions respectively effecting disengagement of said sleeve and the teeth on the other of said hub portions.

8. A clutch construction adapted to drivingly connect a pair of rotatable driving and driven members for a plurality of drives comprising a first centrifugal clutch member drivingly mounted on said driving member and non-rotatable relative thereto, a second centrifugal clutch member, adapted to be automatically engaged with said first centrifugal clutch member after said first clutch member attains a predetermined speed of rotation, said second clutch member being rotatably mounted on said driven member by means of a hub portion, said hub portion including a blocker ring supporting surface and a toothed peripheral portion, a gear journaled on said driven member and spaced axially from said second clutch member, said gear having a hub portion provided with a toothed peripheral portion and a blocker ring supporting surface, a blocker ring mounted on each of said blocker ring supporting surfaces, each blocker ring having a set of axially extending overlapping fingers, an overrunning clutch shell drivingly connected to said gear and concentrically mounted about said driven member so as to extend between said gear and said second centrifugal clutch member, an overrunning clutch device drivingly and continuously connecting said shell and the hub of said second centrifugal clutch member, an axially slotted, internally toothed shift sleeve splined to said driven member and shiftable axially thereof, the slots of said sleeve being adapted to receive the fingers of said blocker rings, said sleeve having teeth adapted to be engaged with the teeth on the hub portion of said gear when said sleeve is shifted to one axial position, also having teeth adapted to be engaged with the teeth on the hub portion of said second centrifugal clutch member when said sleeve is shifted to a different axial position, shift of the sleeve into engagement with the teeth on one of said hub portions effecting disengagement of said sleeve and the teeth on the other of said hub portions.

9. A clutch construction adapted to drivingly connect a pair of rotatable driving and driven shafts comprising a first centrifugal clutch member drivingly mounted on said driving shaft and non-rotatable relative thereto, a second centrifugal clutch member rotatably mounted on said driven shaft, said centrifugal clutch members being adapted to be engaged after said driving shaft has attained a predetermined speed of rotation, a gear rotatably mounted on said driven shaft, an axially slotted, cylindrically shaped, overrunning clutch shell carried by said gear and mounted concentrically about said driven shaft so as to permanently extend between said gear and said second centrifugal clutch member, an overrunning clutch means connected between said shell and said second centrifugal clutch member to provide for simultaneous rotation of said gear and said second centrifugal clutch member in one direction, a shift sleeve mounted within said shell and drivingly connected to said driven shaft and shiftable axially thereof for selective drive transmitting engagement with said second centrifugal clutch member and said gear, speed synchronizing blocker ring means arranged between said shift sleeve and both the second centrifugal clutch member and the gear, a shift ring mounted concentrically about said shell, said ring having pin means extending through the axially extending slotted portion of said shell and connecting said ring with said sleeve so as to provide means for effecting axial shift of said sleeve, said shift sleeve being adapted to be shifted to one axial position so as to be synchronously connected with said second centrifugal clutch member, said sleeve also being adapted to be shifted axially to another position to synchronously connect said sleeve with said gear.

10. In a power transmitting device, a drive shaft, a first, centrifugal force actuable, clutch member carried by said drive shaft and non-rotatable relative thereto, gearing driven by said drive shaft including a driven pinion, a driven shaft, a second clutch member rotatably mounted on said driven shaft and adapted to be drivingly engaged with said first centrifugal force actuable clutch member after said drive shaft has attained a predetermined speed of rotation, a manually operable clutch shift sleeve drivingly mounted on said driven shaft, means on said second clutch member adapted to be drivingly connected to said driven shaft through said shift sleeve, a driven gear journalled on said driven shaft, said driven gear being in constant mesh with said driven pinion, means on said driven gear adapted to be drivingly engaged with said shift sleeve, an overrunning clutch shell carried by said driven gear and mounted concentrically about said driven shaft and said shift sleeve and positioned so as to extend between said driven gear and said second clutch member, and overrunning clutch means permanently connecting said shell and said second clutch member arranged to insure continuous rotation of the second clutch member at the speed of or at a greater speed than that of the driven gear, said shift sleeve having means adapted to be selectively engaged with said driven gear when said sleeve is shifted to one axial position and means adapted to be selectively engaged with the second clutch member, when said sleeve is shifted to a different axial position, synchronous engagement of said sleeve with either said driven gear or said second clutch member being facilitated due to the permanent connection of the driven gear and second clutch member through the overrunning clutch shell.

AUGUSTIN J. SYROVY.
WILLIAM T. DUNN.
ROY T. BUCY.

References Cited in the file of this patent
UNITED STATES PATENTS

| Number | Name | Date |
|---|---|---|
| 2,134,316 | Raven | Oct. 25, 1930 |
| 2,170,926 | Keller | Aug. 29, 1939 |
| 2,212,731 | Dunn | Aug. 27, 1940 |
| 2,343,312 | Maurer | Mar. 7, 1944 |
| 2,380,559 | Tyken | July 31, 1945 |
| 2,383,149 | Neracher | Aug. 21, 1945 |
| 2,438,381 | Banker | Mar. 23, 1948 |